Nov. 16, 1937.  H. M. ULLSTRAND  2,099,041

REFRIGERATION

Filed July 9, 1936

INVENTOR.
Hugo M. Ullstrand
BY
Ell Fenander
his ATTORNEY.

Patented Nov. 16, 1937

2,099,041

UNITED STATES PATENT OFFICE 2,099,041

REFRIGERATION

Hugo M. Ullstrand, Evansville, Ind., assignor to Servel, Inc., New York, N. Y., a corporation of Delaware Application July 9, 1936, Serial No. 89,706

5 Claims. (Cl. 62—139)

My invention relates to a method of and apparatus for producing refrigeration in connection with internal combustion engines which are either stationary or employed for driving or propelling automobiles, motor boats, motor vehicles, or the like.

It has been proposed to produce refrigeration in connection with internal combustion engines wherein the expansion of fluid fuel is utilized to produce cold, and the fuel is subsequently introduced into the engine.

It is an object of my invention to provide an improved system for producing refrigeration in connection with internal combustion engines whereby a greater amount of useful cold is produced. I accomplish this by supplying only a portion of the air to the region of lower pressure in which the expansion of fuel takes place, and subsequently supplying additional air to the gaseous mixture which is formed in the region of lower pressure before such mixture is introduced into the engine.

Figure 1:
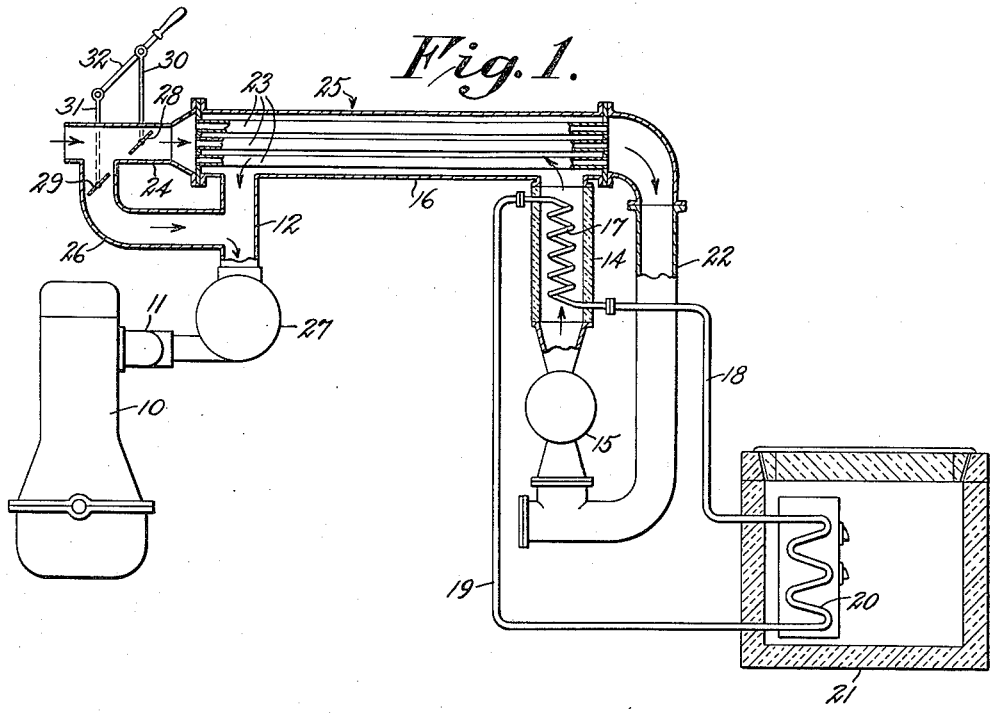
Figure 2:
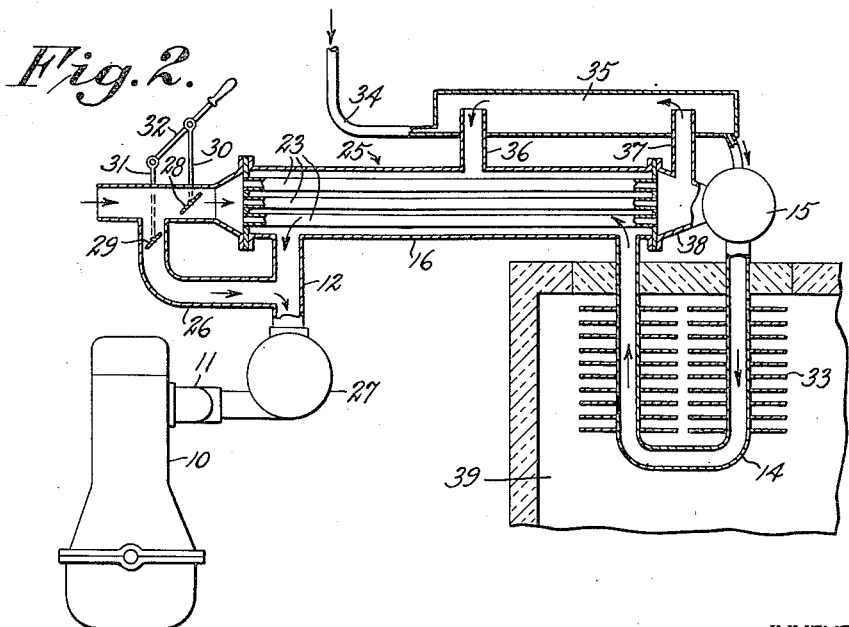

My invention, together with the above and other objects and advantages thereof, will be more fully understood upon reference to the following description and the accompanying drawing forming a part of this specification, and of which Fig. 1 is a diagrammatic illustration of an embodiment of my invention for an internal combustion engine shown in connection with a refrigeration system; and Fig. 2 is a modification of the embodiment shown in Fig. 1.

Referring to Fig. 1 of the drawing cylinder block 10 of an internal combustion engine such as, for example, for a motor vehicle, is provided with an intake manifold 11. The combustible mixture of air and fuel flows to the suction inlet of the manifold 11 through a conduit 12, and is delivered in the usual manner to the cylinders. A well insulated vaporization chamber or conduit 14 is arranged between a carburetor 15 and duct 16 and forms, with the connecting member or conduit 12, part of the gas passage leading to the intake manifold 11. The chamber 14 serves for the production of cold and within it is disposed a coil 17 connected by conduits 18 and 19 to a second coil 20 which is located within the compartment of a refrigerator cabinet 21. The coils 17 and 20 and connecting conduits 18 and 19 form a closed system which is filled with a fluid that absorbs heat from the refrigerator cabinet 21 and transfers this heat to the chamber 14 where the heat produces evaporation of the fuel for the engine. This fluid, which may be termed an auxiliary fluid, may evaporate in the coil 20 and condense in the coil 17.

Air may be supplied to the carburetor 15 through conduit 22, tubes 23 which are arranged within the duct 16 and open at both ends, and conduit 24 which is open to the atmosphere. The tubes 23 and duct 16 form a heat exchange device 25. Between conduits 12 and 24 is connected an air by-pass conduit 26, and in the conduit 12 between the by-pass conduit 26 and intake manifold 11 is connected a compressor 27 which may be termed a supercharger. The compressor 27 may be driven, for example, by the internal combustion engine 10. The compressor 27 withdraws the gaseous mixture from the duct 16 and also draws air directly from the atmosphere through by-pass conduit 26 which mixes with the gaseous mixture and increases the proportion of air in the latter. Control valves 28 and 29 are arranged in the conduits 24 and 26, respectively, and are connected by levers 30 and 31 to a common control member 32.

During normal operation of the engine, atmospheric air enters the conduit 24 and flows through the tubes 23 and conduit 22 to the carburetor 15. The liquid fuel, which is conducted from a suitable source of supply (not shown) and may consist of liquid benzene or gasoline or a mixture thereof, for example, is atomized in the carburetor 15 and passes in a finely divided state into the vaporization chamber 14 together with the air supplied from the atmosphere.

The pressure within the chamber 14 is below that of atmosphere because of the suction produced by the compressor 27, and this reduced pressure causes evaporation of the fluid particles. Due to this evaporation of the fluid particles heat is taken up from the surroundings, and, since the vaporization chamber 14 is well insulated, this heat can only be withdrawn from the coil 17. The cold produced in the vaporization chamber 14 is transferred by the fluid in the coil 17 to the part to be cooled, such as the refrigerator cabinet 21, as described above.

The air in the chamber 14, which is saturated with fuel vapor, flows through the duct 16 and cools the incoming air flowing through the tubes 23 of the heat exchange device 25. From the duct 16 the air saturated with fuel vapor flows into the duct 12 and mixes with additional air drawn directly from the atmosphere through conduit 24 and the by-pass conduit 26. The combustible mixture in the conduit 12 flows into the compressor 27 from which it is discharged at an increased pressure into the intake manifold 11 and delivered to the cylinders of the internal combustion engine. The amount of air supplied to the carburetor 15 through the tubes 23 and the amount of air drawn into conduit 12 through the by-pass conduit 26 is controlled by means of the valves 29 and 28, respectively.

By supplying only a part of the air to the carburetor 15 and subsequently introducing additional air to the conduit 12 through the by-pass conduit 26, the amount of useful refrigeration produced in the chamber 14 is greatly increased. Whereas approximately fifteen pounds of air is required per pound of gasoline for the operation of the internal combustion engine, only slightly more than one pound of air is theoretically required to evaporate one pound of gasoline at 22° F. When only a portion of the air required for the combustible mixture is supplied to the carburetor 15, lower refrigeration temperatures are obtained in the chamber 14. With a smaller quantity of air flowing through the tubes 23, the load on the heat exchange device 25 is less whereby the latter may be reduced in size. If it is assumed that the efficiency of the heat exchange device 25 is about 70 per cent, the amount of useful refrigeration obtained in a system of the character described above is increased more than 100 per cent over similar systems in which all of the air is supplied to the carburetor.

Fig. 2 illustrates a modification of the embodiment shown in Fig. 1 in which similar parts are indicated by the same reference numerals. This modification differs from the embodiment described above in that the vaporization or cooling chamber 14 is located directly in a compartment 39 to be cooled and is provided with fins 33 to increase the amount of heat transfer surface. In order to increase the amount of useful refrigeration obtained, liquid fuel flowing to the carburetor 15 is pre-cooled by flowing in contact with air which has been cooled in the tubes 23 of the heat exchange device 25. This may be accomplished by conducting fuel from a source of supply (not shown) through conduit 34 to the carburetor 15. The conduit 34 is provided with an enlarged chamber 35 which is connected at opposite ends by means of conduits 36 and 37 with the duct 16 and header 38 at the end of the heat exchange device 25 adjacent the carburetor 15.

The operation of the embodiment shown in Fig. 2 is substantially the same as that described above in connection with the embodiment shown in Fig. 1 and differs therefrom in that heat is transferred directly from the compartment 39 to the vaporization or cooling chamber 14. In addition, the liquid fuel flowing to the carburetor 15 is pre-cooled in the chamber 35 by cool air which flows through conduit 37 into the chamber 35 and from the latter through conduit 36 into the duct 16. By pre-cooling the liquid fuel in chamber 35, additional cooling in the vaporization chamber 14 is obtained.

Although I have shown and described several embodiments of my invention, it will be apparent to those skilled in the art that various modifications and changes may be made without departing from the spirit and scope of my invention.

What is claimed is:

1. A method of refrigeration with the aid of an internal combustion engine which consists in producing a region of pressure lower than that obtainable by the suction action of said engine, introducing liquid fuel and air into said region, vaporizing said fuel in the presence of said air to form a gaseous mixture, supplying heat for vaporizing said fuel from a body to be cooled, cooling air before introduction into said region by heat transfer to said mixture, adding additional air to said gaseous mixture after such heat transfer to form a suitable combustible mixture, increasing the pressure of said combustible mixture, and introducing said combustible mixture at an increased pressure into said engine.

2. Refrigeration apparatus including an internal combustion engine, a cooling member, means for conducting air to said cooling member including a heat exchanger, means for conducting liquid fuel to said cooling member including a carburetor, and means including said heat exchanger and a compressor for conducting an air-gas mixture from said cooling member to said engine and for introducing additional air to said mixture before it enters said engine.

3. Refrigeration apparatus including an internal combustion engine, a cooling member, means for conducting air and volatile liquid fuel to said cooling member, and structure for conducting an air-gas mixture from said cooling member to said engine, said structure including means for adding additional air to said mixture and for introducing said mixture into said engine at an increased pressure.

4. A method of refrigeration with the aid of an internal combustion engine operating on liquid fuel and air, which comprises admitting said liquid fuel to a region of lower pressure and supplying heat by conduction from a body to be cooled external to the path of flow of fluids supplied to said engine to cause vaporization of the fuel, introducing a portion of the air to said region to form a mixture of the air and the vaporized fuel, cooling air before introduction into said region by heat transfer to said mixture, adding additional air to said mixture after such heat transfer to form a suitable combustible mixture, and introducing said combustible mixture into said engine.

5. A method of refrigeration with the aid of an internal combustion engine operating on liquid fuel and air, which comprises admitting said liquid fuel to a region of lower pressure and supplying heat by conduction from a body to be cooled external to the path of flow of fluids supplied to said engine to cause vaporization of the fuel, introducing a portion of the air to said region to form a mixture of the air and the vaporized fuel, cooling the air before introduction into said region by heat transfer to said mixture, cooling liquid fuel before introduction into said region by heat transfer to a portion of the pre-cooled air, mixing said portion of the air with said gaseous mixture, thereafter adding additional air to said gaseous mixture to form a suitable combustible mixture, and introducing said combustible mixture into said engine.

HUGO M. ULLSTRAND.